Figure 1:
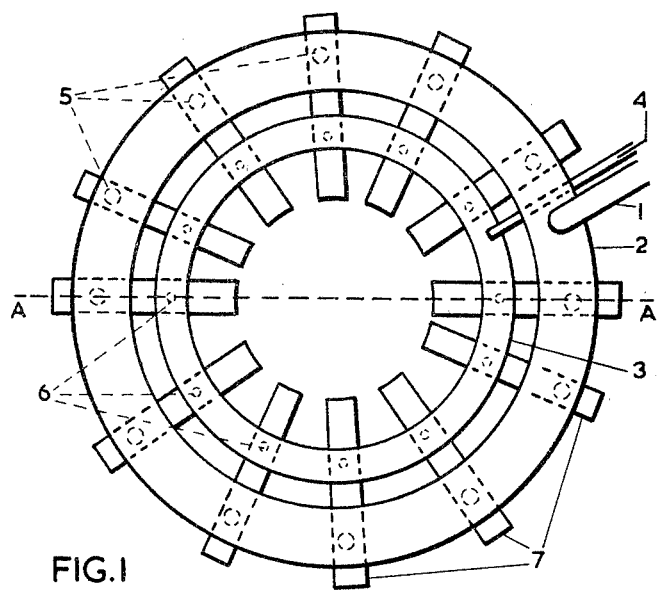

United States Patent Office 3,271,457
Patented Sept. 6, 1966

3,271,457
PROCESS FOR THE PRODUCTION OF PHENOL
Thomas Bewley and Maurice Dudley Cooke, Epsom, England, assignors to The Distillers Company Limited, Edinburgh, Scotland, a British company
Filed Apr. 16, 1962, Ser. No. 187,738
Claims priority, application Great Britain, Apr. 22, 1961, 14,653
6 Claims. (Cl. 260—593)

The invention relates to an improved process for the production of phenols by the catalytic decomposition of alkaryl hydroperoxides and more particularly to the production of phenol and by-product acetone by the catalytic decomposition of cumene hydroperoxide.

The production of phenols by the acid catalysed reaction of an alkaryl hydroperoxide, e.g., cumene hydroperoxide, is disclosed in our British Patent No. 684,039. In this process cumene hydroperoxide is added to a homogeneous reaction medium comprising acetone and concentrated sulphuric acid. The reaction may be carried out in a vessel equipped with an overflow, stirrer and the necessary inlets for the addition of cumene hydroperoxide, acetone and sulphuric acid and outlet for the removal of product. The cumene hydroperoxide is normally introduced into the reactor through a sparging ring. The vessel may also be equipped with a condenser for the reflux of acetone which is thus continuously recycled to the reaction mixture. This condensation of acetone and subsequent recycle provides a means of removing the exothermic heat of reaction. The recycled condensed acetone may contain other compounds including entrained condensed acid.

In the actual practice of the above process, although the bulk of the reactor contents is maintained at the desired temperature, super heating of the surface layer, and the gas phase above is frequently experienced. It has been found that under these conditions the resulting reaction mixture is colored black and large amounts of residues, mainly tars, are formed. Further under extreme conditions such superheating may give rise to undesirable overheating of the hydroperoxide in the sparging ring.

It is an aim of the present invention to provide a means of safely mixing the alkaryl hydroperoxide and reflux ketone, thus reducing the amount of superheating and increasing the yield of phenols, by mixing the hydroperoxide with reflux ketone within the reaction before contact with the acidic reaction mixture.

Accordingly the present invention provides a process for the production of phenols and by-product ketone by the acid catalysed decomposition of alkaryl hydroperoxides in a reaction vessel, equipped with means for condensation of vaporised ketone and the recycle of the condensate to the reaction mixture, characterised in that the alkaryl hydroperoxide is intimately premixed and diluted within the reaction vessel with the recycled stream of condensed ketone before contact with the acidic reaction mixture.

While the process of the present invention may be used in the production of phenols by decomposition of any suitable alkaryl hydroperoxide it finds particular application in the production of phenol and by-product acetone by the sulphuric acid catalysed decomposition of cumene hydroperoxide, and the invention will hereinafter be described, by way of example, with particular reference to this reaction.

The intimate premixture of cumene hydroperoxide and recycled condensed acetone within the reaction vessel may be effected in any suitable manner. For example, jets of hydroperoxide and acetone may be caused to impinge in the gas space above the acid reaction mixture, or to impinge on an open surface, e.g., a plate positioned above the reaction mixture, or on the sides or roof of the reaction vessel itself. The use of any mixing device which will result in thorough mixing of the hydroperoxide and reflux ketone may be used, but from a practical view point, a device which provides as little hold-up as possible of the hydroperoxide feed is preferred. In a preferred embodiment premixing is effected by introducing the hydroperoxide and acetone into the reaction vessel through two separate co-axial sparging rings of different radii. The acetone is preferably fed into the larger radius ring which may be positioned slightly above the smaller radius ring through which the hydroperoxide is introduced. The exit holes in both rings are aligned and constructed to discharge into a series of sloping troughs slung radially, one beneath each pair of discharge holes. Each trough is consequently fed with a stream of recycled acetone and a stream of hydroperoxide. These two streams become suitably mixed as they flow down the troughs and are discharged into the reaction mixture below.

By carrying out the reaction in this manner the superheating in the surface liquid layer and gas phase is kept to a minimum or even eliminated. As a result the final reaction mixture obtained is only lightly colored instead of black as in reactions carried out without the described premixing of the hydroperoxide and acetone, the amount of high-boiling by-product residues produced is less and the yield of phenol is increased.

In operation of the process, the proportion of acid in the reaction mixture is suitably between 0.05 and 10%, preferably between 0.1 and 2% by weight based on the total weight of the reaction mixture.

The reaction is advantageously carried out at temperatures from 50° to about 90° C., and preferably at temperatures between 70 and 85° C.

The reaction may be carried out at atmospheric pressure or under reduced pressure, e.g., between 400 and 500 mm. of mercury.

The hydroperoxide may be utilised, for example, either in the form of the pure hydroperoxide or in the form of a crude oxidation reaction mixture containing the hydroperoxide. When the hydroperoxide is obtained by oxidation using molecular oxygen, the oxidation is usually carried out to give an oxidation product containing the hydroperoxide in admixture with smaller or larger amounts of the original hydrocarbon, and such reaction products may be used as the starting material for the process of this invention. It is preferable, however, to utilize the hydroperoxide in a more concentrated form, and a concentrate of the hydroperoxide may be obtained, for example, by fractional distillation of the oxidation reaction mixture at reduced pressure. A particularly suitable starting material for the process of the present invention is cumene hydroperoxide, preferably admixed with a minor proportion of an inert non-volatile solvent such as cumene.

Figure 2:
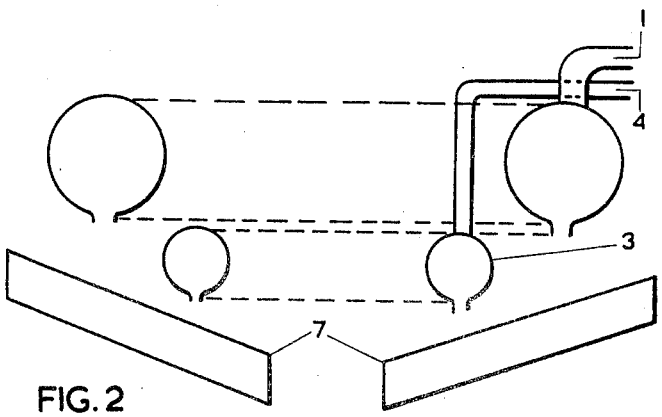

The invention is described in more detail with reference to the accompanying drawings in which: FIGURE 1 represents a plan of the mixing device viewed from above and, FIGURE 2 represents a cross-section of the device at the line A—A on FIGURE 1.

In practice the device is positioned within the reactor in the gas phase above the acid reaction mixture.

On operation acetone reclaimed by condensation of the vapors leaving the reactor is fed into the larger outer sparging ring 2 from feed line 1. Hydroperoxide is similarly fed into the smaller, inner sparging ring 3 from line 4. Generally the outer sparging ring 2 carrying the acetone is of a larger bore than the inner ring 3 to facilitate the rapid introduction of the larger amounts of acetone required. Sparging rings 2 and 3 are provided with a series of exit holes 5 and 6 respectively on their under surface. These holes are aligned in pairs as shown so that the sloping troughs 7 slung beneath each pair of holes received a stream of acetone and a stream of hydroperoxide. The acetone and hydroperoxide streams intermix as they flow down the troughs and overflow from the open ends directly into the acid reaction mixture below.

In a further modification the separate troughs may be replaced by a single sheet in the shape of a funnel suspended below the sparging rings.

By employing the process of the present invention the acetone produced by the decomposition of cumene hydroperoxide cycling from the reaction vessel to a condenser and back to the reaction vessel is generally sufficient to remove the heat of reaction and no addition of fresh acetone from another source may be necessary. However, the possible addition of such fresh acetone, particularly at start-up of the process, may prove advantageous and is envisaged within the scope of the invention.

We claim:
1. A process for the production of phenol and acetone which comprises the steps of:
    (a) thoroughly mixing cumene hydroperoxide with a recycle stream of liquid acetone;
    (b) contacting the mixture with sulphuric acid under conditions wherein acetone vapor is given off from the reaction zone;
    (c) condensing said vapor to form the recycle stream of (a); and
    (d) recovering the phenol from the reaction mixture.

2. A process as claimed in claim 1 wherein the hydroperoxide and ketone are intimately premixed by impingement of jets of liquid reactants in the gas space above the acid reaction mixture.

3. A process as claimed in claim 2 wherein the intimate premixing of the hydroperoxide and ketone is effected by impingement of jets of liquid reactants upon an open surface positioned in the gas space above the acid reaction mixture.

4. A process as claimed in claim 3 wherein the open surface is provided by a plate positioned in the gas phase.

5. A process according to claim 3, wherein the open surface is provided by the roof of the reactor in the gas space.

6. A process according to the claim 3 wherein the open surface is provided by the walls of the reactor in the gas space.

References Cited by the Examiner

UNITED STATES PATENTS

| | | | |
|---|---|---|---|
| 2,663,735 | 12/1953 | Filar | 260—621 X |
| 2,736,753 | 2/1956 | Hutchinson | 260—621 |
| 2,757,209 | 7/1956 | Joris | 260—621 |
| 2,761,877 | 9/1956 | Mosnier | 260—621 X |
| 2,904,407 | 9/1959 | Rosenthal | 23—252 |
| 2,904,592 | 9/1959 | Ellis et al. | 260—593 |
| 3,026,183 | 3/1962 | Cole | 23—252 |

LEON ZITVER, *Primary Examiner.*

D. P. CLARKE, D. D. HORWITZ, *Assistant Examiners.*